(12) United States Patent
Wiese et al.

(10) Patent No.: US 12,066,141 B2
(45) Date of Patent: Aug. 20, 2024

(54) SLIPPAGE DETECTION (71) Applicant: iPEK International GmbH, Sulzberg (DE)

(72) Inventors: Johannes Wiese, Immenstadt-Eckarts (DE); Gerhard Kennerknecht, Oberstdorf-Tiefenbach (DE); Daniel Münzer, Probstried (DE)

(73) Assignee: IPEK International GmbH, Sulzberg (DE)

( * ) Notice: Subject to any disclaimer, the term of this patent is extended or adjusted under 35 U.S.C. 154(b) by 364 days.

(21) Appl. No.: 17/506,392

(22) Filed: Oct. 20, 2021

(65) Prior Publication Data

US 2022/0120372 A1  Apr. 21, 2022

(30) Foreign Application Priority Data

Oct. 20, 2020 (EP) .................................. 20 202 898

(51) Int. Cl.
| | |
|---|---|
| *F16L 55/30* | (2006.01) |
| *G01D 5/14* | (2006.01) |
| *G05B 13/02* | (2006.01) |
| *G05D 3/12* | (2006.01) |
| *F16L 101/12* | (2006.01) |
| *F16L 101/30* | (2006.01) |

(52) U.S. Cl.
CPC ................. *F16L 55/30* (2013.01); *G01D 5/14* (2013.01); *G05B 13/024* (2013.01); *G05D 3/125* (2013.01); *F16L 2101/12* (2013.01); *F16L 2101/30* (2013.01)

(58) Field of Classification Search
CPC ......... G05B 13/024; F16L 55/30; E03F 9/00; E03F 7/12; G01D 5/14; G05D 3/125; G01B 7/026
See application file for complete search history.

(56) References Cited

U.S. PATENT DOCUMENTS

| | | | |
|---|---|---|---|
| 4,570,348 A | * | 2/1986 | Amsler .................. G01B 7/046 33/734 |
| 2015/0198463 A1 | | 7/2015 | Weischedel |

FOREIGN PATENT DOCUMENTS

DE  102009015503 A1  10/2010

OTHER PUBLICATIONS

Hunger Ibak H GMBH & Co KG, Espacenet Machine Translation of Application DE202013007512U1, Aug. 26, 2013, Espacenet machine translation (Year: 2013).*
European Search Report with English machine translation issued for corresponding European Application No. 20202898.1 dated Apr. 6, 2021.

* cited by examiner

*Primary Examiner* — Christopher W Carter
(74) *Attorney, Agent, or Firm* — Myers Wolin, LLC (57) ABSTRACT A propulsion system is provided for advancing a cable of a sewer cleaning and/or sewer inspection system, comprising a propulsion device, a measuring device for measuring the advancement of the cable, and an evaluation device. The propulsion device and the measuring device are adapted to provide a first and a second measured value of the advancement of the cable independently of one another, and the evaluation device is adapted to form a difference between the first measured value and the second measured value. A control device may be provided which adjusts the advancement based on the determined difference. A correspondingly designed method is also provided.

11 Claims, 9 Drawing Sheets

SLIPPAGE DETECTION

CROSS REFERENCE TO RELATED APPLICATIONS

This application claims priority to European Patent Application No. 20 202 898.1, filed Oct. 20, 2020, the contents of which are incorporated by reference herein.

TECHNICAL FIELD

The invention relates to a propulsion system for advancing a cable of a sewer inspection and/or maintenance system, and to a method for reducing slippage when advancing a cable of a sewer inspection and/or maintenance system.

BACKGROUND

Sewer inspection and/or maintenance systems are introduced into a sewer and advanced or moved in the sewer in order to inspect or to maintain or repair the sewer. Sewer inspection and/or maintenance systems of this kind usually have cables or push rods by means of which sensors and/or image recording devices can be advanced in the sewer.

Usually, the cable or the push rod is pushed into the sewer or advanced in the sewer by means of a propulsion device. The propulsion device may be a driven wheel or a driven belt. The cable touches the driven wheel or belt and is advanced due to the static friction between the surface of the cable and the wheel or belt. A propulsion device of this kind may be arranged, for example, on a trolley that is moved in the sewer in order to advance or retract a cable or a push rod relative to the trolley. However, a propulsion device of this kind may also be arranged on a cable drum, which is usually located outside the sewer shaft, in order to unwind the cable or the push rod from the cable drum or to wind same onto the cable drum.

Ideally, the cable or the push rod is conveyed by the propulsion device without any errors or wear. However, this ideal case rarely occurs in practice.

In practice, difficulties in conveying the cable or the push rod through the propulsion device may for example include the following:

The diameter of the cable/push rod changes over its length, for example due to crushing.

Cables/push rods of different diameters are to be conveyed.

The cable/push rod is to be conveyed in such a way that the cable/push rod is not damaged. In particular, it is intended to ensure that the cable/push rod is conveyed with as little wear as possible.

While the cable/push rod is being conveyed, the frictional or adhesive properties of the cable/push rod can change constantly. The frictional or adhesive properties depend, in particular, on external environmental influences, such as soiling. The frictional or adhesive properties may for example also depend on the rigidity and/or on the outer material of the cable/push rod.

In practice, the difficulties mentioned usually have the following disadvantages:

Slippage occurs between the cable/push rod and the propulsion device, and therefore the cable/push rod is no longer conveyed or is not conveyed as desired.

The slippage can lead to wear of the cable/push rod and/or wear of the propulsion device, in particular the wheels or belts.

Said slippage arises when the static friction between the propulsion device and the cable/push rod required for the effective advancement of the cable/push rod is not achieved, and therefore the wheel or belt rotates without further conveying the cable/push rod. This results in the further disadvantage that the actual advancement (i.e. the length conveyed in one and/or the other direction) of the cable/push rod can no longer be correctly determined. As such, the exact position of, for example, the head of a push rod in the sewer can no longer be determined under certain circumstances, which can mean that the exact position of damaged areas in the sewer can no longer be determined, either.

Another disadvantage of the slippage is that the sliding friction that occurs between the propulsion device and the cable/push rod leads to an undesired generation of heat. As a result, firstly, the cable/push rod, in particular the outer layer of the cable/push rod, can heat up, and therefore breaks have to be taken in order to cool the cable/push rod down again. A heated cable/push rod can also be subject to greater wear than an unheated cable/push rod. Secondly, the propulsion device, i.e. the wheel or the belt, can also heat up considerably as a result, which can lead to considerable and rapid wear of the propulsion device.

The problem of heating also has a particularly negative effect when, for example, a trolley of a sewer inspection and/or maintenance system is to be used in an explosive environment, and the propulsion device is arranged on the trolley. The risk of explosion is then significantly increased.

SUMMARY

An object of the present invention is therefore to provide solutions which at least partially avoid the disadvantages known from the prior art and which ensure an effective, largely slip-free advancement of the cable.

According to the invention, this object is achieved by a system and a method according to the independent claims. Advantageous embodiments and developments of the invention are specified in the respective dependent claims.

Accordingly, a propulsion system is provided for advancing a cable of a sewer cleaning and/or sewer inspection system, comprising
  a propulsion device,
  a measuring device for measuring the advancement of the cable, and
  an evaluation device,
wherein
  the propulsion device is adapted
    to effect the advancement of the cable and
    to provide a first measured value of the advancement of the cable,
  the measuring device is adapted to provide a second measured value of the advancement of the cable independently of the propulsion device, and
  the evaluation device is adapted to form a difference between the first measured value and the second measured value.

A difference between the first measured value and the second measured value can be indicative of slippage between the cable and the propulsion device.

The propulsion system or the evaluation device may comprise a control device, wherein the control device is adapted
  to control the advancement of the cable by the propulsion device, and
  to adjust the advancement of the cable by the propulsion device, in particular to slow it down or accelerate it, if the amount of the difference between the first measured value and the second measured value is greater than zero or exceeds a predetermined threshold value.

The control device may be adapted to adjust the advancement of the cable by the propulsion device, preferably to adjust same in stages, until the amount of the difference between the first measured value and the second measured value is equal to or close to zero or falls below the predetermined threshold value.

The measuring device for measuring the advancement of the cable may comprise
- a compensation device, comprising
  - at least one magnet mounted so as to be rotatable about an axis of rotation, and
  - a magnet holder for receiving the at least one rotatably mounted magnet, and
- a magnetic field sensor, wherein
- the cable can be guided past the compensation device while the cable is being advanced,
- the at least one rotatably mounted magnet is arranged on the magnet holder in such a way that the advancement of the cable can cause rotations of the at least one rotatably mounted magnet about the axis of rotation, wherein the magnet holder of the compensation device is adapted to follow a movement of the cable in the radial direction during advancement, and
- the magnetic field sensor is arranged at a distance from the at least one rotatably mounted magnet and is adapted to detect the rotations of the at least one rotatably mounted magnet, wherein the detected rotations are a measure of the advancement of the cable.

The magnet holder of the compensation device is adapted to follow a movement of the cable in the radial direction during advancement in order to ensure that the rotation of the magnet is produced even in the event of a radial movement of the cable during advancement. A movement of the cable in the radial direction can occur, for example, when the cable moves away from the compensation device, past which the cable is guided during advancement.

In one embodiment of the invention, the magnet may be arranged in a housing, wherein the housing may preferably have a rough surface.

The compensation device of the measuring device for measuring the advancement of the cable may comprise an actuator, in particular a spring element, which acts on the magnet holder, wherein the actuator is designed to cause
- a pivoting of the magnet holder about a pivot axis or
- a linear displacement of the magnet holder,
as a result of which the magnet holder follows the radial movement of the cable.

It can be advantageous if the magnet holder of the measuring device for measuring the advancement of the cable comprises a pivot arm, and the at least one rotatably mounted magnet is arranged at the free end of the pivot arm. In the context of the invention, "at a free end" means that the magnet may be arranged in the region of the free end or in the vicinity of the free end.

In one embodiment of the invention, the propulsion device may comprise
- at least one driven wheel,
- at least one belt drive,
- at least one driven roller, and
- combinations thereof.

The propulsion device may be arranged on a trolley of the sewer cleaning and/or sewer inspection system. In this case, the propulsion device is adapted to convey the cable forwards or backwards relative to the trolley. The measuring device may also be arranged on the trolley of the sewer cleaning and/or sewer inspection system.

In one embodiment of the invention, the propulsion device may be arranged on a cable drum, preferably at the outlet of the cable drum. In this case, the propulsion device is adapted to unwind the cable from the cable drum. In one embodiment of the invention, the propulsion device may also be adapted to wind the cable onto the cable drum. The measuring device may also be arranged on the cable drum.

In another embodiment of the invention, two propulsion devices may be provided, one propulsion device being on a cable drum and the other propulsion device being arranged on a trolley of the sewer cleaning and/or sewer inspection system.

The invention also provides a method for reducing slippage when advancing a cable of a sewer cleaning and/or sewer inspection system, in particular for reducing slippage between the cable and a propulsion device of the sewer cleaning and/or sewer inspection system during advancement of the cable, wherein
a) a first measured value of the advancement of the cable is determined,
b) a second measured value of the advancement of the cable is determined, wherein the second measured value is determined independently of the first measured value,
c) a difference is formed between the first measured value and the second measured value, and
d) the advancement of the cable is adjusted, preferably slowed down or accelerated, if the amount of the difference is greater than zero or exceeds a predetermined threshold value, wherein the slippage is reduced by adjusting the advancement.

The advancement of the cable may be adjusted, preferably adjusted in stages, until the amount of the difference between the first measured value and the second measured value is equal to zero or close to zero or falls below the predetermined threshold value.

To determine the second measured value,
a) a rotatably mounted magnet may be arranged on the cable, wherein the magnet is rotated by means of the cable being advanced,
b) a magnetic field sensor may be arranged relative to the magnet, wherein the rotations of the magnet are detected by means of the magnetic field sensor, and
c) the second measured value may be derived from the detected rotations.

The first measured value and/or the second measured value may each be formed by a moving average of measured values over a predetermined time period.

Furthermore, a propulsion system is provided for advancing a cable, in particular a push rod, of a sewer cleaning and/or sewer inspection system, comprising
- a propulsion device,
- a temperature sensor,
- an evaluation device, and
- a control device, wherein
  - the propulsion device is adapted to effect the advancement of the cable,
  - the temperature sensor is arranged on or in the propulsion device or following on from the propulsion device in the advancement direction of the cable and is adapted to detect a temperature of the cable or of the propulsion device,
  - the evaluation device is adapted to check whether the detected temperature is above or below a predetermined threshold value, and the control device is adapted
  to control the advancement of the cable by the propulsion device, and
  to adapt the advancement of the cable by the propulsion device, preferably to slow it down or to accelerate it, if the detected temperature exceeds the predetermined threshold value.

The temperature of the cable is preferably the surface temperature or the temperature of the cable sheath or the temperature of the outer layer of the push rod. The temperature of the propulsion device is preferably the temperature, in particular the surface temperature, of the conveying elements, i.e. the temperature of the driven wheels, driven rollers or the belt drives.

The control device may be adapted to adjust the advancement of the cable by the propulsion device, preferably to adjust same in stages, until the detected temperature falls below the predetermined threshold value.

Furthermore, a method is provided for reducing slippage when a cable, in particular a push rod, is advanced between the cable and a propulsion device of a sewer cleaning and/or sewer inspection system, wherein
a) a temperature of the cable is measured on or in the propulsion device or after the propulsion device in the advancement direction of the cable,
b) it is checked whether the measured temperature is above or below a predetermined threshold value, and
c) the linear advancement of the cable by the propulsion device is adjusted, preferably slowed down or accelerated, if the measured temperature exceeds the predetermined threshold value.

The advancement of the cable may be adjusted, preferably adjusted in stages, until the measured temperature falls below the predetermined threshold value.

The cables mentioned above may in each case be a push rod or a power cable or a data cable or a combination thereof.

BRIEF DESCRIPTION OF THE DRAWINGS

Further details and features of the inventions as well as specific, in particular advantageous, embodiments of the invention are apparent from the following description in conjunction with the drawings, in which.

DETAILED DESCRIPTION

Embodiments of the invention are described below on the basis of a cable. According to the invention, a push rod may also be used instead of a cable.

The materials and methods of the present invention are in no way restricted to the embodiments described below, but rather serve to better understand the invention. Nevertheless, the materials and methods described below are advantageous embodiments of the invention.

When a "linear" advancement of a cable or push rod is mentioned below, this means that a cable or push rod is advanced, i.e. conveyed, along its longitudinal axis. Within the context of the invention, this also means the unwinding or winding of a cable or push rod from a cable drum or onto a cable drum with the aid of a propulsion system.

In the following, "advancement" always means conveying of the cable or push rod in one or the other direction relative to the propulsion system. This means that, during advancement, the cable or push rod is pushed into the sewer or pushed out of the sewer (if the propulsion system is in the sewer, for example on a trolley) or pulled out thereof (if the propulsion system is outside the sewer, for example located on a cable drum).

Figure 1:
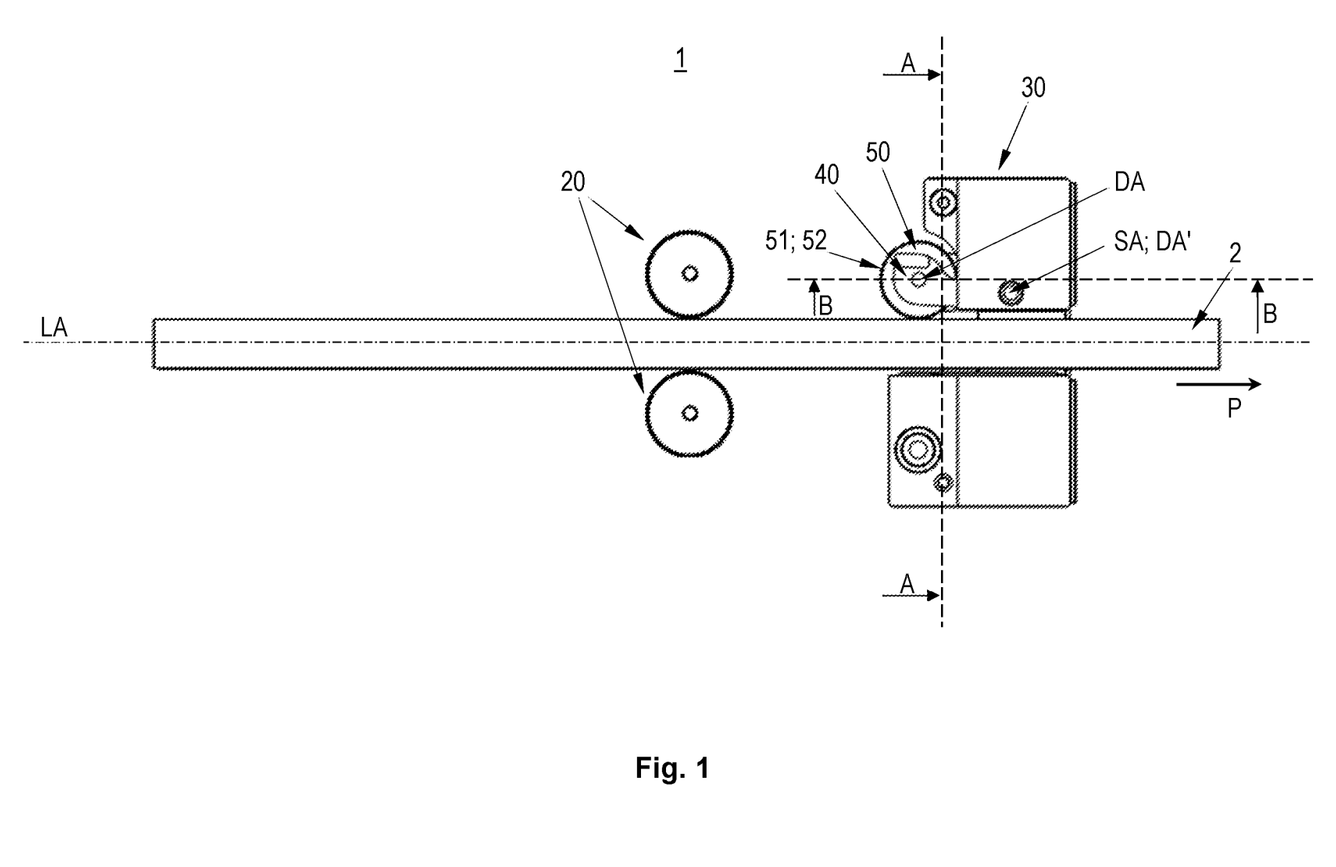
FIG. 1 shows a propulsion system for advancing a cable.

FIG. 1 shows an embodiment of a propulsion system 1 for advancing a cable 2 of a sewer cleaning and/or sewer inspection system.

By means of the propulsion system 1, the cable 2 can be pushed or conveyed forwards (in the direction of the arrow P) or backwards (counter to the direction of the arrow P). The cable 2 may be a relatively rigid cable, the propulsion system 1 also being suitable for advancing less rigid or slack cables. By means of the propulsion system 1, push rods, in particular, can also be advanced, which as a rule are designed to be very rigid.

Inspection units (e.g. cameras) or tools (e.g. grippers) may be arranged at the front end of the cable 2 or push rod.

The propulsion system 1 comprises a propulsion device 20. The propulsion device 20 here comprises two wheels or rollers, at least one of the two wheels/rollers being driven. The cable is clamped between the two wheels. By means of the driven wheels/rollers, which rest on the surface of the cable, the cable is moved when the wheels/rollers turn. The second wheel or the second roller serves as a counter wheel or counter roller that is not driven.

As an alternative to the two wheels/rollers, two drive belts may also be provided, one of the two belts also being driven here. However, both belts may also be driven.

In yet another alternative, the propulsion device 20 may comprise a roller/wheel and a belt, the belt preferably being driven.

In yet another alternative, the propulsion device 20 may comprise a clamping jaw drive for advancing the cable 2.

The feature common to all embodiments of a propulsion device 20 described above is that, when the cable 2 is advanced, the advancing force can be greater than the static friction between the propulsion device 20 and the cable 2, which can result in slippage between the cable and the propulsion device 20. This is particularly (but not only) the case when the surface of the cable 2 or the rollers/belts/ wheels are dirty or damp, which results in the static friction between the propulsion device 20 and cable 2 being significantly reduced.

A challenge when advancing a cable 2 of a sewer cleaning and/or sewer inspection system is that of detecting such slippage during advancement of the cable 2 as soon as possible after it occurs in order to be able to correctively intervene in the propulsion system, to adjust the rate of advance somewhat, or to switch off the propulsion system in the event of extreme slippage.

In order to identify/detect slippage (hereinafter also referred to as slip detection), the propulsion device 20 is adapted to provide a first measured value M1 of the advancement. The first measured value M1 indicates how far the propulsion device 20 would have advanced the cable 2 under ideal conditions, i.e. without slippage. The first measured value M1 can be derived, for example, from the number of revolutions of the drive wheels. The propulsion device 20 comprises suitable detection means for this, which are known per se from the prior art. However, in the event of slippage, the first measured value M1 deviates from the actual advancement.

Furthermore, the propulsion system 1 comprises a measuring device 10 for measuring the advancement of the cable 2, only the compensation device 30 of the measuring device being visible in FIG. 1. By means of the measuring device, an advancement of the cable is detected or measured independently of the propulsion device 20.

The measuring device here comprises a compensation device 30 and a magnetic field sensor, which cannot be seen in FIG. 1. The magnetic field sensor is adapted to detect rotations of a magnet that is part of the compensation device 30, it being possible to derive a measure for the advancement of the cable 2 from the number of detected rotations of the magnet. Based on the number of detected rotations of the magnet, the measuring device provides a second measured value M2 of the advancement independently of the propulsion device 20. The second measured value M2 indicates how far the cable 2 was actually advanced. The measuring device is described in detail with reference to FIGS. 2 to 7.

The propulsion system 1 also comprises an evaluation unit 80 (see FIG. 9), which is adapted to process the first measured value M1 provided by the propulsion device 20 and the second measured value M2 provided by the measuring device 10. The method steps for processing the two measured values M1, M2 and the reduction in the slippage of the cable 2 made possible thereby are described in detail with reference to FIG. 8.

Figure 9:
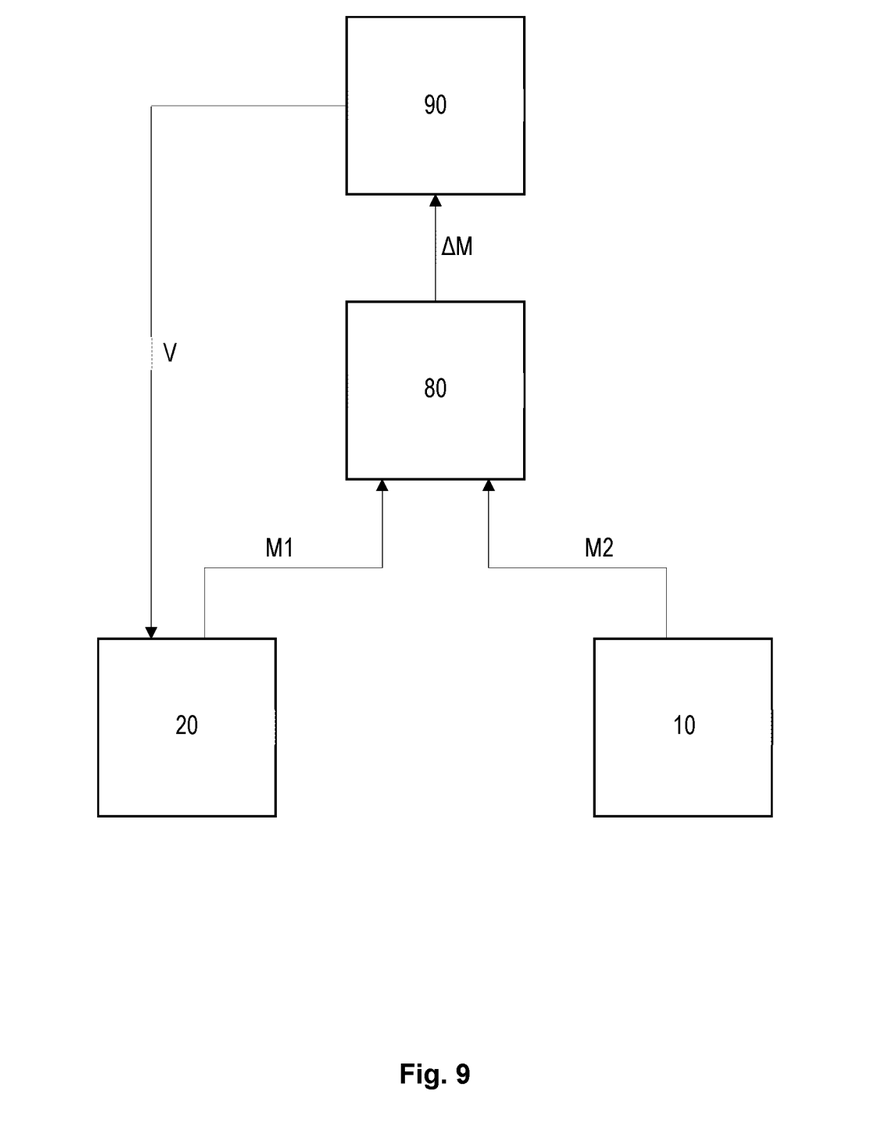
FIG. 9 is a block diagram of a propulsion system for explaining a method for reducing slippage during advancement of a cable.

The evaluation unit 80 essentially calculates a difference ΔM between the first measured value M1 and the second measured value M2, and compares this difference with a predetermined threshold value T. If the threshold value T is exceeded, there is a certain amount of slippage that should or must be reduced.

If the amount of the difference ΔM equals zero, then the cable is advanced without slippage. If the amount of the difference ΔM is between zero and the threshold value T, then there is a degree of slippage that can be tolerated. In one embodiment of the invention, the slippage can be reduced even when the difference ΔM is between zero and the threshold value T, such that advancement can be continuously regulated.

To reduce the slippage, the propulsion system 1 or the evaluation unit 80 comprises a control device 90, the control device being adapted to control the advancement of the cable 2 by the propulsion device 20. In one embodiment of the invention, the advancement of the cable 2 by the propulsion device 20 can be slowed if the amount of the difference ΔM between the first measured value M1 and the second measured value M2 exceeds the predetermined threshold value T. However, the advancement of the cable 2 through the propulsion device 20 may also be slowed as soon as the amount of the difference ΔM between the first measured value M1 and the second measured value M2 is greater than zero.

The control device 90 may be adapted to slow down the advancement or the propulsion device, preferably to slow same down in stages, until the amount of the difference ΔM between the first measured value M1 and the second measured value M2 falls below the predetermined threshold value T again or until the amount of the difference ΔM between the first measured value M1 and the second measured value M2 is again zero or close to zero.

In an alternative embodiment, the advancement of the cable 2 may also be accelerated when the predetermined threshold value T is exceeded. This may be necessary, for example, when the advanced cable lags behind another unit advanced in the sewer due to the slippage and the associated reduced advancement rate, i.e. is advanced more slowly than the other unit due to the slippage. For example, two cables may be pushed into a sewer independently of one another, for example each by means of a propulsion system 1 shown here. If slippage occurs on the cable in one of the propulsion systems but no slippage occurs in the other propulsion system, then the cable advanced by said former propulsion system will lag behind the other cable. In order to make up for this "lag" caused by the slippage, the advancement of the cable is accelerated.

In another embodiment of the invention, the cable 2 may be advanced by means of two mutually independent propulsion devices 20. One propulsion device may be arranged on a trolley located in the sewer that, for example, pushes a push rod into a side channel. The other propulsion device may be arranged on a cable drum which is located outside the sewer and which unwinds the push rod from the cable drum and pushes it into the sewer (in the direction of the trolley). In this case, the propulsion device of the trolley may push the push rod into the side channel without slippage, while the propulsion device of the cable drum pushes the push rod into the sewer with slippage. In order to the reduced advancement on the cable drum compared to the advancement on the trolley, which is caused by the slippage on the cable drum, the advancement by the propulsion device of the cable drum may be accelerated.

The propulsion device 20 is accordingly intended to effect the advancement of the cable 2 (in the direction of the arrow P or counter to the direction of the arrow P) and at the same time to provide a first measured value M1 which represents the target advancement (the target advancement may deviate from the advancement actually effected (=actual feed) due to slippage). The measuring device 10 is accordingly provided for measuring the effective advancement of the cable 2 (=actual advancement, which is provided as the second measured value M2), i.e. the advancement actually effected by the propulsion device 20. If the cable 2 is advanced by the propulsion device 20 without any slippage, the two measured values M1 and M2 do not differ from one another, or only differ from one another by a negligibly small value.

As explained above, the control device 90 may be adapted to adjust (accelerate or slow down) the advancement if the difference ΔM between the first measured value M1 and the second measured value M2 exceeds the predetermined threshold value T. In one embodiment of the invention, however, the advancement may also be adjusted if the amount of the difference ΔM is between zero and the threshold value T. For example, by accelerating the propulsion device (e.g. drive belt or drive wheel), if necessary, more static friction can again be generated between the propulsion device and the push rod/cable, such that the difference can be compensated for or reduced before the threshold value T is reached. If the threshold value T is nevertheless exceeded, alternative measures can be initiated, for example the entire system can be switched off in order to avoid damage to the system and/or to the push rod/cable.

In the following, embodiments of a measuring device 10 are presented with reference to FIGS. 2 to 7. As described with reference to FIG. 1, the measuring device 10 may be part of a propulsion system 1 and thus make a significant contribution to the detection of slippage of the cable 2. Alternatively, the measuring device may be used independently of a propulsion system for measuring an advancement of a cable 2.

Figure 2:
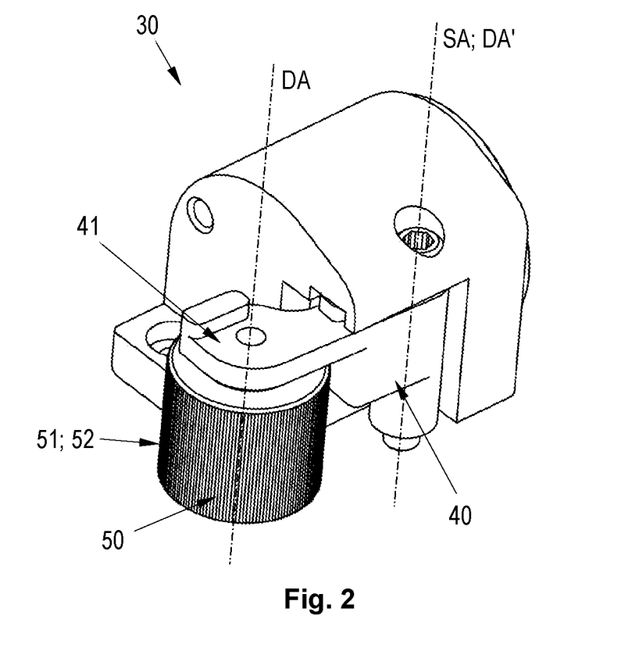
FIG. 2 is a perspective view of a compensation device of a measuring device for measuring an advancement of a cable.

FIG. 2 is a perspective view of a compensation device 30 of a measuring device 10 for measuring an advancement of a cable 2.

The compensation device 30 comprises a magnet 50 mounted so as to be rotatable about an axis of rotation DA and a magnet holder 40 for receiving the magnet 50. The magnet holder 40 is designed here as a pivot device that can be pivoted about a pivot axis SA. An alternative embodiment of a compensation device 30 is described with reference to FIG. 11.

In the embodiment shown in FIG. 2, the pivot device 40 comprises a pivot arm 41, at the free end of which the magnet 50, which is mounted so as to be rotatable about the axis of rotation DA, is arranged. The pivot arm 41 is pivoted by applying an actuating force. The actuating force is provided by an actuator or actuating means, for example a spring element. The actuating force acting on the pivot arm causes the free end of the pivot arm 41 and thus also the magnet 50 arranged there to be pivoted in the direction of the cable 2.

The rotatably mounted magnet 50 is designed here as a diametrically magnetized ring magnet, it also being possible for the magnet 50 to be a diametrically magnetized disc magnet or to have a different shape, provided that the magnet 50 is magnetized perpendicularly to the axis of rotation DA. The magnet 50 has at least one north pole and at least one south pole. In FIG. 2, the magnet 50 is arranged on the underside of a rotatably mounted element 52.

In this embodiment, the rotatably mounted element 52 simultaneously forms a housing 51 in which the magnet 50 is arranged. The housing 51 may generally have a shape that is rotationally symmetrical about the axis of rotation DA, the cylindrical shape shown in FIG. 2 being merely an example.

In one embodiment, the housing 51 may have a concavely curved surface that is adapted to a convexly curved surface of the cable 2, such that the housing makes an effective contribution to guiding the cable 2. Movements of the cable along the longitudinal axis of the housing 51 can thus be reduced or avoided.

When the cable 2 is advanced, the cable 2 is guided past the compensation device 30. The rotatably mounted magnet 50 is arranged on the magnet holder 40 or on the pivot device 40 in such a way that the advancement of the cable 2 causes rotations of the magnet 50 about the axis of rotation DA. Furthermore, the magnet holder 40 or the pivot device 40 of the compensation device 30 is adapted to follow a movement of the cable 2, in particular a movement of the cable in the radial direction, during the advancement. This ensures that, even in the event of a radial movement of the cable 2, i.e. when the cable moves away from the magnet 50, the rotation of the magnet 50 is brought about by the cable 2 during advancement. In the embodiment shown in FIG. 2, the housing 51 or the rotatably mounted element 52 touches the cable 2 (see FIG. 1) such that the linear advancement of the cable 2 causes rotations of the rotatably mounted element 52 and thus of the rotatably mounted magnet 50 about the axis of rotation DA.

Figure 3:
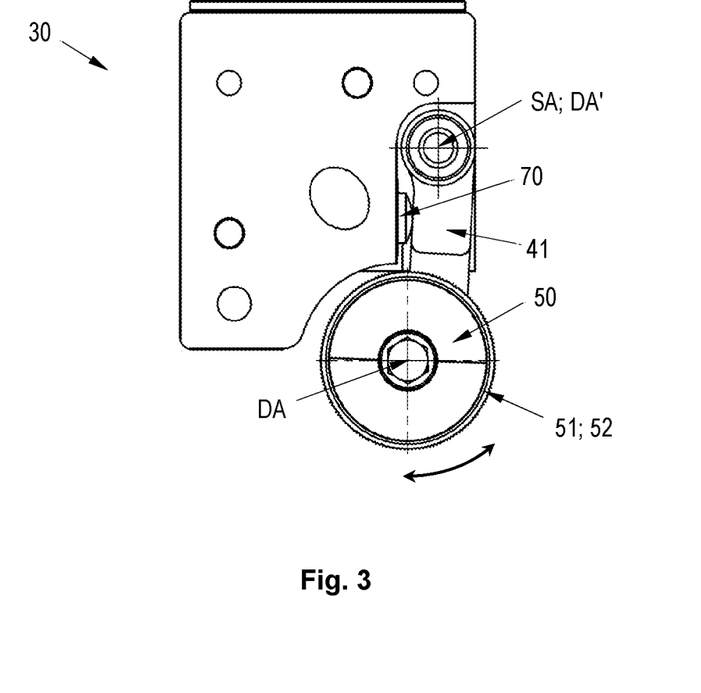
FIG. 3 shows the compensation device from FIG. 2 in a view from below.

FIG. 3 shows the compensation device 30 from FIG. 2 in a view from below.

This view also shows an embodiment of the actuator 70 as a spring element. The pivot arm 41 is acted upon by an actuating force by means of the spring force provided by the spring element, which causes the pivot device 40 to pivot about the pivot axis SA. This ensures that the magnet holder 40 or the pivot device 40 follows the radial movement of the cable 2, since the spring force acting on the pivot arm 41 ensures that the free end of the pivot arm 41 is permanently pressed against the cable 2 that is guided past.

The magnet 50 is arranged in an element 52 that is mounted so as to be rotatable about the axis of rotation DA, the rotatably mounted element 52 forming a housing 51 for the rotatably mounted magnet 50 and being arranged here at the free end of the pivot arm 41. By means of the actuating force of the actuator 70 or spring element 70, the pivot arm 41 of the pivot device 40 is pushed towards the cable 2 in such a way that the housing 51 or the rotatably mounted element 52 touch the cable 2. This has the effect that an advancement of the cable 2 sets the rotatably mounted element 52 or the housing 51 in rotation, as a result of which the magnet arranged in the rotatably mounted element 52 or housing 51 is also set in rotation about the axis of rotation DA.

In another embodiment, the actuator 70 or the spring element 70 may be integrated into the pivot axis SA and thus also generate an actuating force that causes the magnet holder 40 or the pivot device 40 to pivot about the pivot axis SA.

In the following, the position information "left," "right," "below" and "above" refer to the cable 2 to be advanced.

Figure 4:
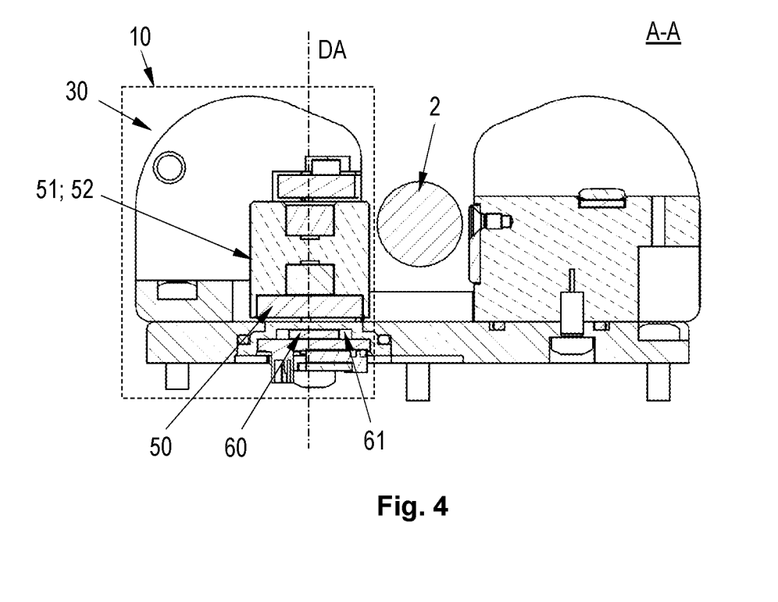
FIG. 4 is a sectional view of the measuring device along the section A-A shown in FIG. 1.

FIG. 4 is a sectional view of the measuring device 10 along the section A-A shown in FIG. 1.

In the illustration in FIG. 4, the compensation device 30 is arranged to the left of the cable 2 to be advanced. An arrangement of the measuring device 10 on the right, below or above the cable 2 to be advanced would be equally conceivable.

Here, the magnet 50 is arranged in a housing 51, which in turn is mounted so as to be rotatable about the axis of rotation DA. As a result, the magnet 50 can also be rotated about the axis of rotation DA.

In one embodiment of the invention, the magnet 50 may also be arranged on the pivot arm such that it can rotate about the axis of rotation DA without a housing. This applies equally to all embodiments of the invention presented herein.

The magnetic field sensor 60 is arranged at a distance from the rotatably mounted magnet 50 of the compensation device 30. The magnetic field sensor 60 is arranged so as to be stationary, i.e. non-movable, such that the magnet 50 rotates relative to the magnetic field sensor 60. In the embodiment shown in FIG. 4, the magnetic field sensor 60 is arranged below the magnet 50.

In the embodiment shown in FIG. 4, the magnetic field sensor 60 is arranged in a space 61 having a positive pressure. An arrangement in a space having a negative pressure is also possible.

It is advantageous if the magnetic field sensor 60 is arranged so as to be offset with respect to the axis of rotation DA of the magnet 50. This ensures that the magnetic field sensor 60 can detect the rotations of the magnet 50, which is designed here as a diametrically magnetized ring magnet. The rotations of the magnet 50 cause a change in the magnetic flux over time in the measuring range of the magnetic field sensor 60, as a result of which the rotations of the magnet 50 can be detected. The rotations detected by the magnetic field sensor 60 are a measure of the advancement of the cable 2.

In another embodiment not shown here, two measuring devices 10 may be provided, one measuring device 10 being arranged on one side of the cable 2 and the other measuring device 10 being arranged on the other (opposite) side of the cable 2. The magnetic field sensors 60 of the two measuring devices 10 can thus detect the rotations of the relevant magnet independently of one another. An average value can be formed from the measured values provided by the two measuring devices 10 and then be used as a measure for the advancement of the cable 2.

Figure 5:
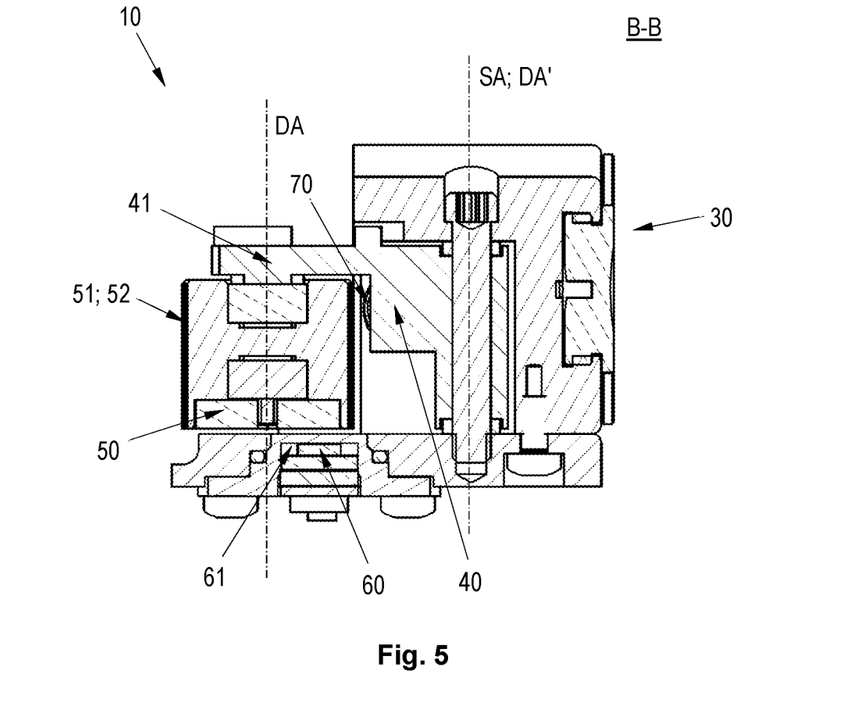
FIG. 5 is a sectional view of the measuring device along the section B-B shown in FIG. 1.

FIG. 5 is a sectional view of the measuring device or the compensation device 30 along the section B-B shown in FIG. 1.

The pivot arm 41, at the free end of which the magnet 50 is arranged, is clearly visible here. Here, too, the magnet 50 is accommodated in a housing 51, which is arranged on the pivot arm 41 so as to be rotatable about the axis of rotation DA. The arrangement of the magnetic field sensor 60 offset with respect to the axis of rotation DA can also be seen here, as can the actuator 70, which is pressing against the pivot arm 41 from behind.

In another embodiment of the measuring device 10, the magnetic field sensor 60 may be arranged on the magnet holder 40 or on the pivot arm 41 at a distance from the magnet 50. In this embodiment, the magnet 50, which is mounted so as to be rotatable about the axis of rotation DA, may also be arranged at the free end of the pivot arm 41. It can also be advantageous here if the magnetic field sensor 60 is arranged so as to be offset with respect to the axis of rotation DA of the magnet.

Figure 6:
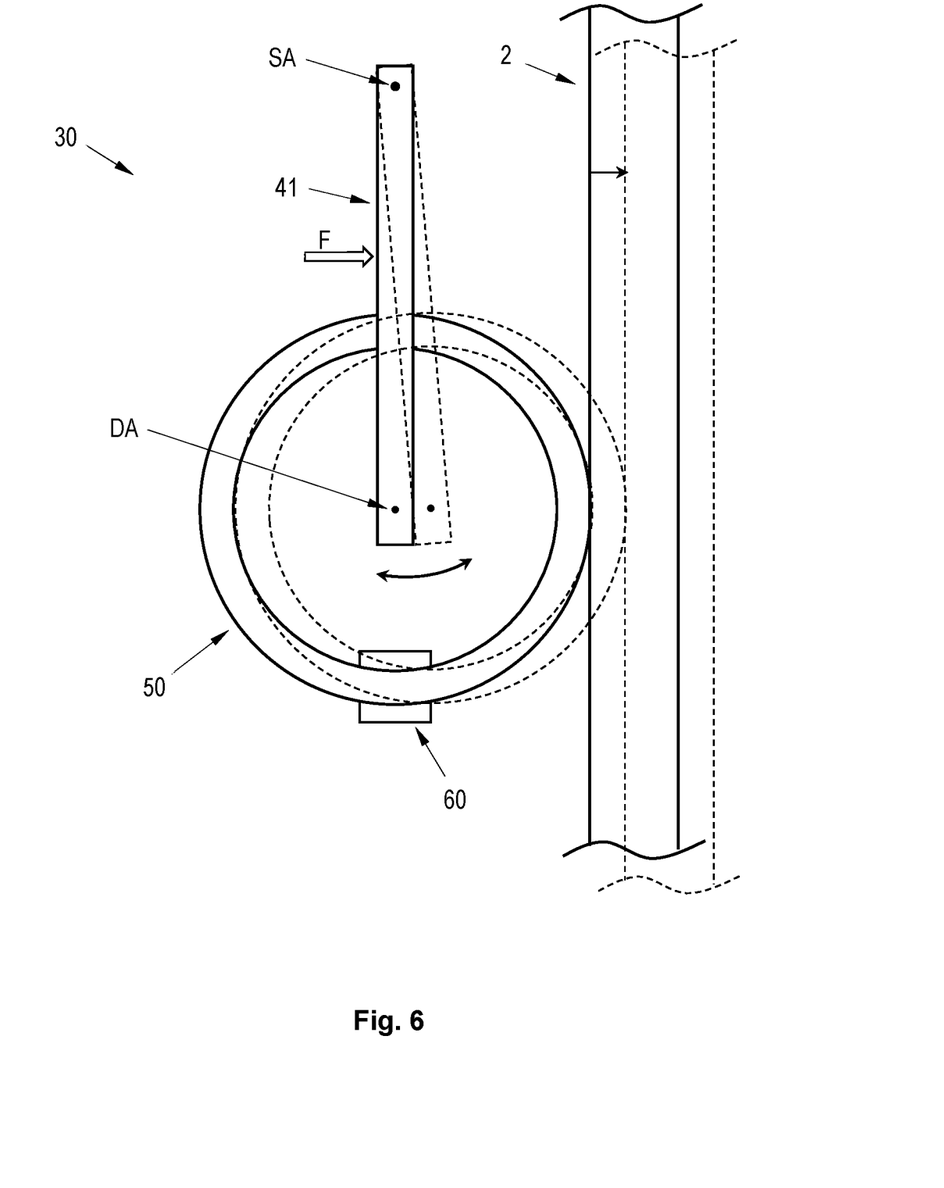
FIG. 6 shows an embodiment and the corresponding functioning of a measuring device.

FIG. 6 shows the functioning of the pivot device 40 of an embodiment of the compensation device 30.

The pivot device is arranged so as to be pivotable about the pivot axis SA and comprises a pivot arm 41. A magnet 50 that is mounted so as to be rotatable about an axis of rotation DA is arranged at the free end of the pivot arm 41, the rotatably mounted magnet touching the cable 2. A magnetic field sensor 60 is arranged at a distance from the rotatably mounted magnet 50 and is adapted to detect rotations of the rotatably mounted magnet 50 about the axis of rotation DA, the detected rotations being a measure of the advancement of the cable 2.

In the event of a radial movement of the cable 2, shown in FIG. 6 by the dashed lines, the rotatably mounted magnet 50 follows the cable 2 by means of the pivot device 40 or pivot arm 41 pivoting about the pivot axis SA. The pivoting of the pivot arm 41 can be brought about by means of an actuating force F acting on the pivot arm 41. The actuating force F may for example be provided by a spring element.

This ensures that the rotatably mounted magnet 50 touches the cable 2 even in the event of a radial movement of the cable 2, such that the cable 2 causes the rotatably mounted magnet 50 to rotate continuously about the axis of rotation DA during advancement.

The rotatably mounted magnet 50 is mounted with as little friction as possible.

Figure 7:
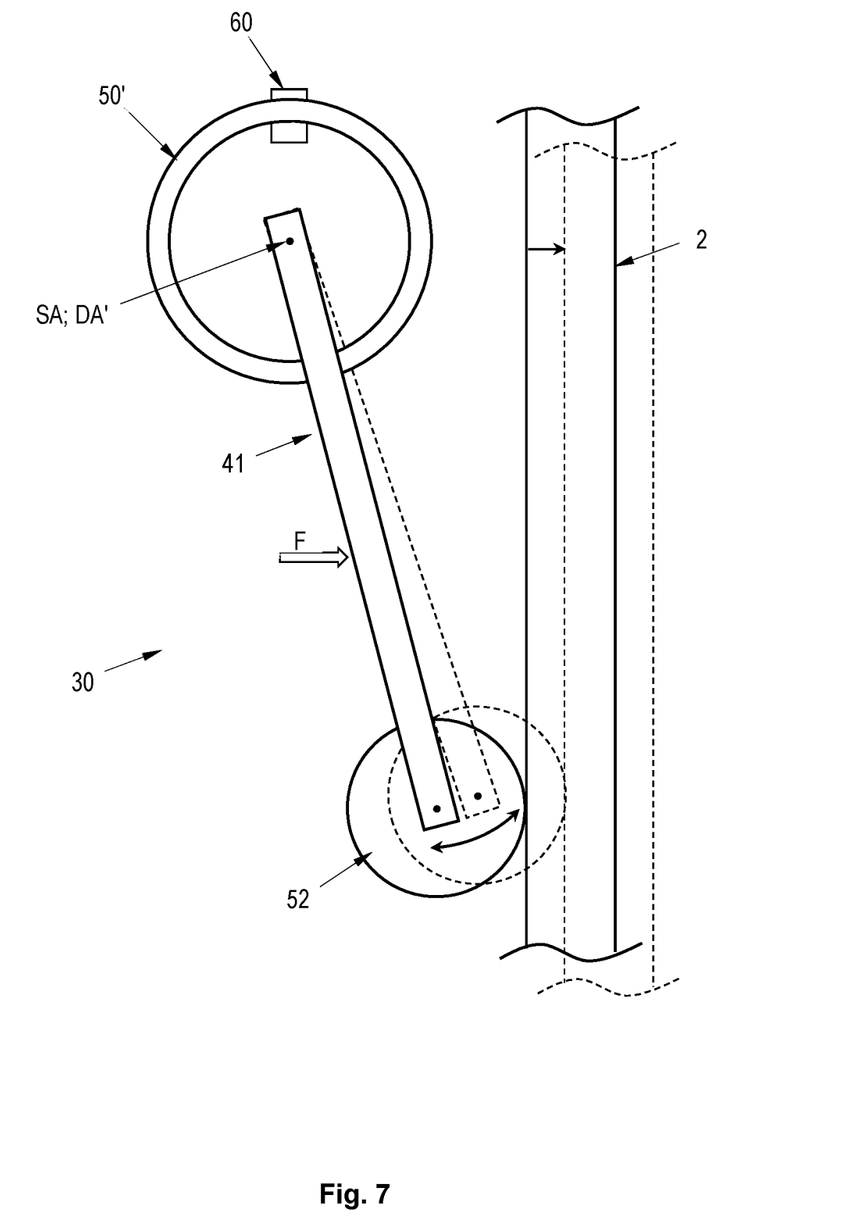
FIG. 7 shows an alternative embodiment and the corresponding functioning of a measuring device.

FIG. 7 shows the functioning of the pivoting device 40 of an alternative embodiment of the compensation device 30.

Here, too, the pivot device 40 is arranged so as to be pivotable about the pivot axis SA and comprises a pivot arm 41. According to this alternative embodiment, the magnet 50' is arranged so to be rotatable about the pivot axis SA. In this case, the axis of rotation DA', about which the magnet can be rotated, coincides with the pivot axis SA. The magnet 50' may also be arranged in a housing 51 in this embodiment.

In this alternative embodiment, an element 52 mounted so as to be rotatable about an axis of rotation is arranged at the free end of the pivot arm 41 in such a way that the advancement of the cable 2 causes rotations of the rotatably mounted element 52.

The rotatably mounted element 52 can be or is coupled to rotatably mounted magnets 50'. The rotatably mounted element 52 and the rotatably mounted magnet 50' may be coupled via a belt, for example. As a result of the coupling, rotations of the rotatably mounted element 52 can be transmitted to the rotatably mounted magnet 50' in order to rotate the rotatably mounted magnet 50'.

The magnetic field sensor 60 is arranged at a distance from the rotatably mounted magnet 50' and is adapted to detect rotations of the rotatably mounted magnet 50' about the axis of rotation DA', the detected rotations also being a measure for the advancement of the cable 2 here.

In the event of a radial movement of the cable 2, shown in FIG. 7 by the dashed lines, the rotatably mounted element 52 follows the cable 2 by means of a pivoting of the pivot arm 41. The pivoting of the pivot arm 41 may also be brought about here by means of an actuating force F acting on the pivot arm 41. The actuating force F may for example be provided by a spring element.

This ensures that the rotatably mounted element 52 touches the cable 2 even when the cable 2 moves radially, such that the cable 2 causes continuous rotations of the rotatably mounted element 52 about the axis of rotation DA during advancement, the rotations of the element 52 also causing rotations of the magnet 50' about the axis of rotation DA' on account of the coupling.

Figure 8A:
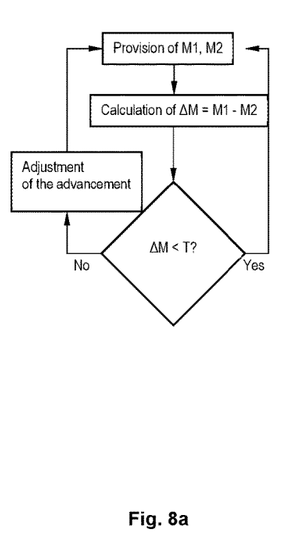
FIG. 8a shows a first variant of a method for detecting slippage during advancement of a cable.

FIG. 8a is a flow chart of a first variant of a method for detecting slippage when a cable 2 is being advanced.

In the method for reducing slippage of a cable 2, a first measured value M1 of the advancement of the cable 2 is determined. Furthermore, a second measured value M2 of the advancement of the cable 2 is determined independently of the first measured value M1. The first measured value M1 and the second measured value M2 can be determined with a predetermined frequency. The second measured value M2 represents the actually performed advancement of the cable 2 (=actual advancement).

A difference ΔM is formed between the first measured value M1 and the second measured value M2, and the advancement of the cable 2 is adjusted (slowed down or accelerated) if the amount of the difference ΔM exceeds a predetermined threshold value T.

In one embodiment of the method, the second measured value M2 can be determined by means of the measuring device 10 described above. To determine the second measured value M2, a rotatably mounted magnet 50; 50' that is rotated by means of the advancement of the cable 2 is arranged on the cable 2. Furthermore, a magnetic field sensor 60 is arranged relative to the magnet 50; 50', the rotations of the magnet 50; 50' being detected by means of the magnetic field sensor 60 such that the second measured value M2 can be derived from the detected rotations. This also applies to the methods described with reference to FIGS. 8b and 8c.

In an alternative embodiment of the method according to the invention, the advancement of the cable 2 can be adjusted, preferably adjusted in stages, until the amount of the difference ΔM between the first measured value M1 and the second measured value M2 falls below the predetermined threshold value T again.

Figure 8B:
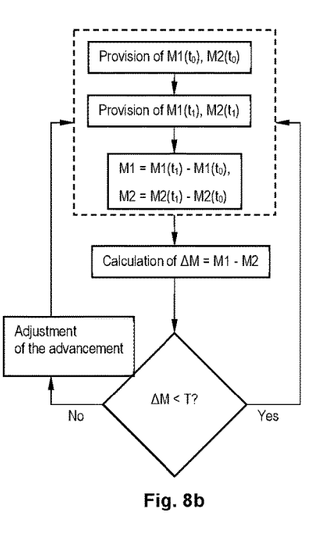
FIG. 8b shows a second variant of a method for detecting slippage during advancement of a cable.

FIG. 8b shows a variant of the method in which the measured values M1 and M2 each represent the difference in the advancement of the cable 2 over a predetermined time period.

Figure 8C:
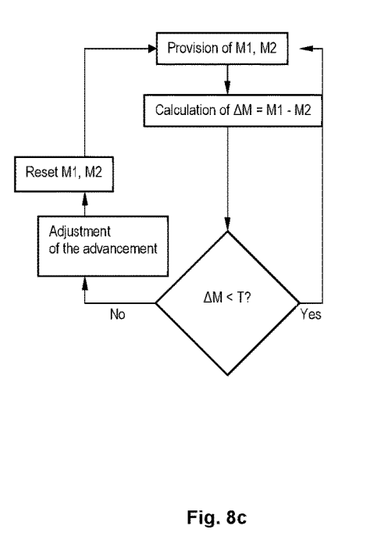
FIG. 8c shows a third variant of a method for detecting slippage during advancement of a cable.

FIG. 8c shows another variant of the method in which the measured values M1 and M2 each represent the last measured advancement of the cable 2. The two variants are described below on the basis of a run-through of the method steps.

In the variant shown in FIG. 8b, the linear advancement of the cable 2 can for example be measured with a predetermined frequency. The values measured at the measuring time to for the first measured value $M1(t_0)$ and the second measured value $M2(t_0)$ of the advancement of the cable are temporarily stored and provided. Likewise, the measured values at the current measuring time $t_1$, that is to say the first measured value $M1(t_1)$ and the second measured value $M2(t_1)$ for the advancement of the cable 2, are provided and temporarily stored. Based on the measured values provided, the first measured value M1 and the second measured value M2 are each determined from the difference between the measured values at the current measuring time $t_1$ and the measured values at the previous measuring time $t_0$. Thus, the first measured value M1 and the second measured value M2 each represent the stretch of the cable 2 that was linearly advanced in the last elapsed time period between $t_0$ and $t_1$. A difference ΔM is formed between the first measured value M1 and the second measured value M2, and the advancement of the cable 2 is adjusted if the amount of the difference ΔM exceeds a predetermined threshold value T. Before the next run, the measured values at the current measuring time $t_1$ are temporarily stored as measured values for the previous measuring time $t_0$.

In the variant shown in FIG. 8c, the advancement of the cable 2 may also be measured with a predetermined frequency. The first measured value M1 and the second measured value M2 are each determined and provided at the current measuring time. In contrast to the variant shown in FIG. 8b, the measured values from previous measuring times are no longer required. A difference ΔM is formed between the first measured value M1 and the second measured value M2, and the advancement of the cable 2 is slowed if the amount of the difference ΔM exceeds a predetermined threshold value T. If slippage of the cable 2 was detected, the first measured value M1 and the second measured value M2 are each reset to zero for the next check for slippage of the cable 2.

In another variant, not shown here, the first measured value M1 and the second measured value M2 may each also be averaged from a plurality of measurements over a predetermined period of time, or filtered in some other way, in order to minimize noise of the first measured value M1 and/or of the second measured value M2.

FIG. 9 shows a block diagram of a propulsion system 1 for explaining a method for reducing slippage when advancing a cable 2.

The propulsion device 20 of the propulsion system 1 is adapted to advance a cable 2 and thereby provide a first measured value M1 of the advancement (=target advancement) of the cable 2. Furthermore, the measuring device 10 of the propulsion system 1 is adapted to provide a second measured value M2 of the advancement (=actual advancement) of the cable 2.

The first measured value M1 and the second measured value M2 are made available or transmitted to an evaluation device 80, a difference ΔM being formed in the evaluation device 80 between the first measured value M1 and the second measured value M2.

In a variant of the method in which the first measured value M1 and/or the second measured value M2 are determined or filtered from a plurality of measured values as described above, the evaluation device 80 may also determine or filter the first measured value M1 and/or the second measured value M2 from the plurality of measured values.

The first measured value M1 and the second measured value M2 are determined at the same point in time or over the same period of time, such that the difference ΔM between the first measured value M1 and the second measured value M2 is below a predetermined threshold value T, i.e. is essentially zero, when the cable 2 is advanced without slippage.

The evaluation device 80 is coupled or can be coupled to a control device 90, such that data and, if applicable, program commands can be exchanged between the evaluation device 80 and the control device 90. The control device 90 controls the advancement of the cable 2 by the propulsion device 20. If the amount of the difference ΔM exceeds a predetermined threshold value T, the control device 90 effects an adjustment V of the advancement of the cable 2. By means of the adjustment V of the advancement, slippage of the cable 2 can be reduced.

The evaluation device 80 and the control device 90 may be designed as a unit.

Figure 10:
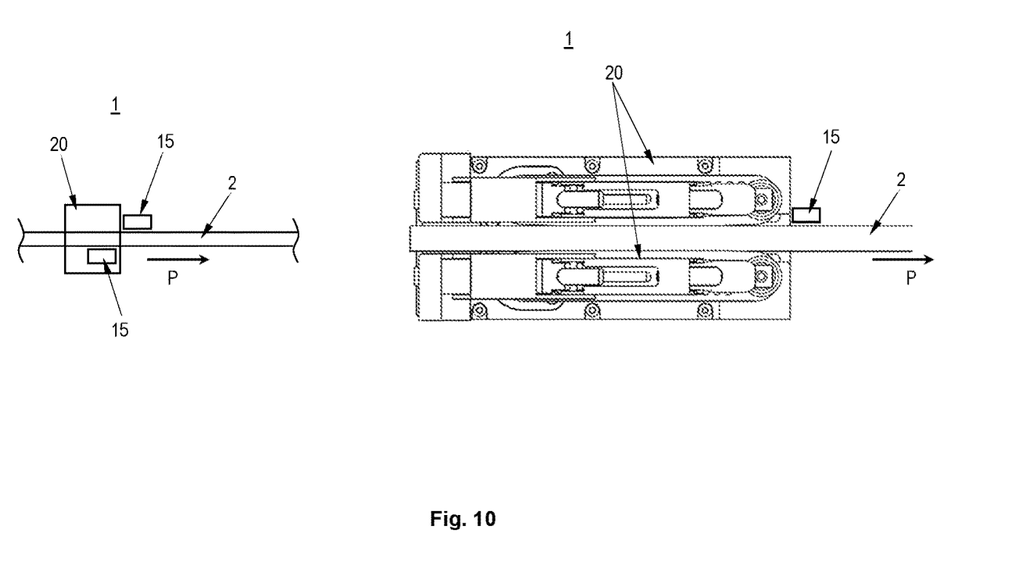
FIG. 10 shows an alternative embodiment of a propulsion system.

FIG. 10 shows an alternative embodiment of the propulsion system 1 for advancing a cable 2 of a sewer inspection and/or maintenance system. In this case, the cable 2 may also be a push rod.

The propulsion system 1 shown in FIG. 10 comprises a propulsion device 20 for advancing the cable 2 and in this case comprises a belt drive. The propulsion system 1 further comprises a temperature sensor 15, 15', the temperature sensor 15, 15' being arranged in the region of the propulsion device 20 or following on from the propulsion device 20 in the advancement direction (arrow P) of the cable 2.

The temperature sensor 15 is preferably adapted to detect a temperature of the cable 2. The temperature of the cable in this case denotes the externally determinable temperature on the surface of the cable 2, thus essentially the temperature of the cable sheath or the outer layer of the push rod. The temperature sensor 15' is preferably adapted to detect a temperature of the propulsion elements, for example of the belts of the belt drive.

The propulsion system 1 also comprises an evaluation device 80 and a control device 90 here. The temperature sensor 15, 15' can provide the evaluation device 80 with the detected temperature of the cable 2 or of the propulsion elements. The evaluation device 80 and the control device 90 can be coupled or are coupled for exchanging data. Furthermore, the control device 90 can control the advancement of the cable 2 by the propulsion device 20. The evaluation device 80 is adapted to check whether the detected temperature is above or below a predetermined threshold value T. The control device is also adapted to adjust the advancement of the cable 2 by the propulsion device 20 if the detected temperature exceeds the predetermined threshold value T.

The temperature sensor 15, 15' can measure the temperature contactlessly, for example via an infrared measurement.

Preferably, the control device 90 is in this case also adapted to adjust the advancement of the cable 2 by the propulsion device 20, preferably to adjust same in stages, until the detected temperature falls below the predetermined threshold value T again.

In order to detect slippage when a cable 2 is being advanced, the measured temperature of the cable 2 or of the advancing elements can provide information about the presence of slippage, since the cable 2 or advancing elements can heat up quickly and to high temperatures in the event of slippage. In the event of slippage, an adjustment, in particular a slowing of the advancement, brings about an immediate reduction in the slippage and thus a significant reduction in the temperature of the cable or the advancing elements.

The method may be adapted in such a way that, when slippage is detected, the advancement is adjusted, preferably adjusted in stages, until the measured temperature falls below the predetermined threshold value T again.

Figure 11:
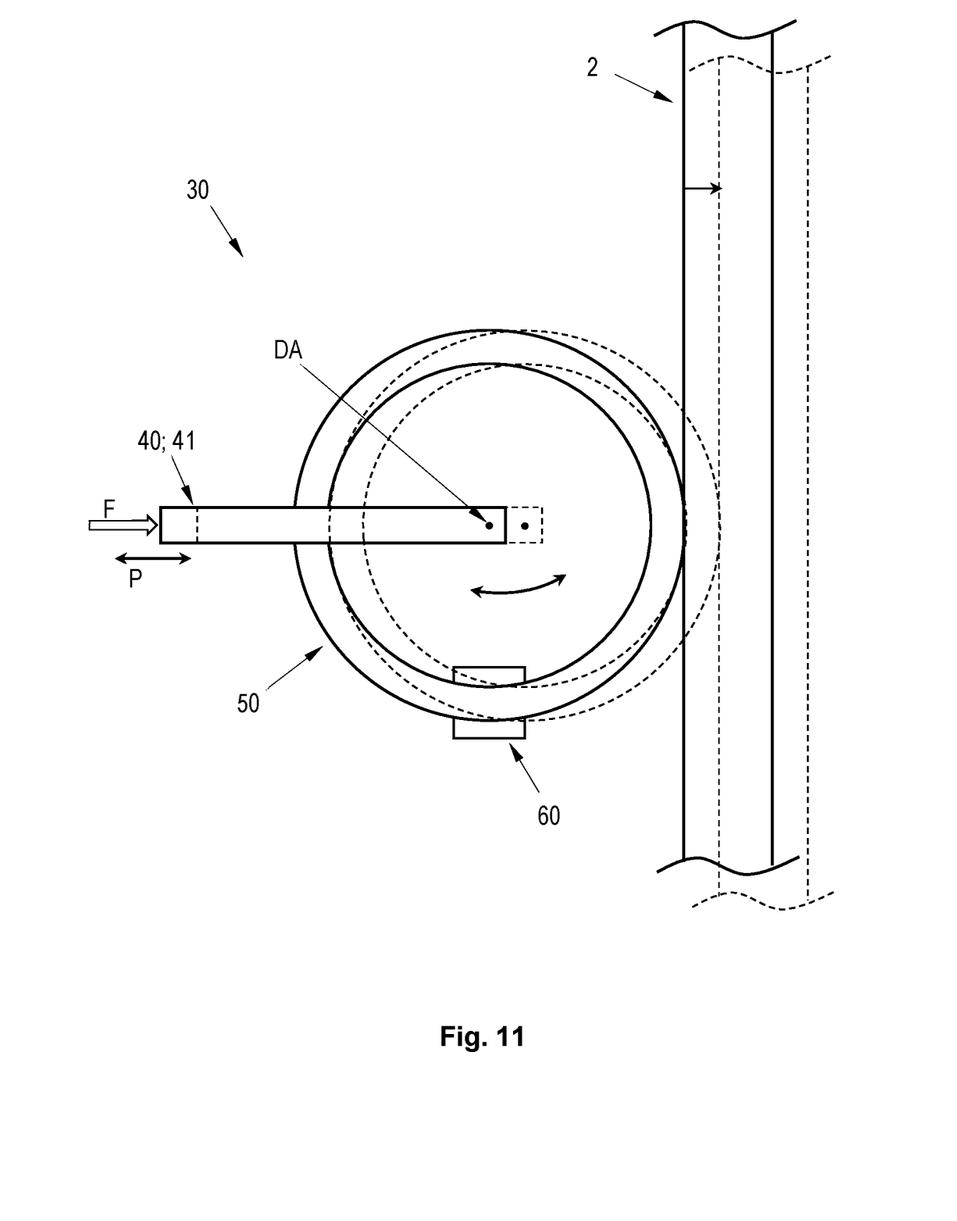
FIG. 11 shows another alternative embodiment and the corresponding functioning of a measuring device.

FIG. 11 shows another alternative embodiment and the corresponding functioning of a measuring device.

In this embodiment, the compensation device 30 of the measuring device 1 also comprises a magnet holder 40, which here comprises an arm 41. A magnet 50, which is mounted so as to be rotatable about an axis of rotation DA, is arranged at the free end of the arm 41, which faces the cable 2. According to this embodiment, the arm 41 itself is aligned substantially perpendicular to the cable 2 and is mounted so as to be movable linearly (in the direction of the arrow P). As in the above-described embodiments of the measuring device 1, the measuring device 1 here also comprises a magnetic field sensor 60, which is arranged at a distance from the magnet 50, such that the magnetic field sensor 60 can detect rotations of the magnet.

An actuating force F is applied to the magnet holder 40 or the arm 41 in order to move the arm 41 towards the cable 2 and thereby press the magnet 50 against the cable 2. The vector of the actuating force F is therefore substantially perpendicular to the longitudinal axis of the cable 2. An actuator, for example a spring element, may be provided for applying the actuating force F to the magnet holder 40 or the arm 41.

The actuating force acting on the magnet holder 40 or on the arm 41 causes the magnet 50 to follow a radial movement of the cable 2, such that it is ensured that the magnet 50 always rests on the cable and, during advancement, the cable rotates the magnet 50 irrespective of a radial movement. The units represented as dashed lines in FIG. 11 show a cable 2, which is being moved radially, and the compensation device 30, which is following the radial movement of the cable.

According to all of the above-described embodiments, the compensation device 30 is designed such that the magnet 50 can follow a radial movement of the cable 2 in any case, that is, if the cable moves to the right during advancement, then the magnet follows this movement and also moves to the right, and therefore the magnet is always on the cable.

REFERENCE SIGNS

1 Propulsion system
2 Cable
10 Measuring device
15, 15' Temperature sensor
20 Propulsion device for advancing the cable 2
30 Compensation device
40 Magnet holder (e.g. pivot device comprising pivot arm)
41 Arm or pivot arm of the magnet holder 40
50, 50' Rotatably mounted magnet
51 Housing
52 Rotatably mounted element
60 Magnetic field sensor
61 Space having a negative pressure/positive pressure
70 Actuator, e.g. spring element
80 Evaluation device
90 Control device
A-A Section A-A
B-B Section B-B
DA, DA' Axis of rotation
F Actuating force
LA Longitudinal axis of the cable 2 or of the propulsion system 1
M1 First measured value of the advancement of the cable 2
M2 Second measured value of the advancement of the cable 2
P Arrow; advancement direction of the cable 2
SA Pivot axis
T Threshold value
V Adjustment (slowing/acceleration) of the cable 2
ΔM Difference between the first measured value M1 and the second measured value M2

The invention claimed is:

1. A propulsion system for advancing a cable of a sewer cleaning and/or sewer inspection system, comprising:
   a propulsion device,
   a measuring device for measuring the advancement of the cable, and
   an evaluation device,
wherein
   the propulsion device is adapted:
      to effect the advancement of the cable and
      to provide a first measured value of the advancement of the cable,
   the measuring device is adapted to provide a second measured value of the advancement of the cable independently of the propulsion device, and
   the evaluation device is adapted to form a difference between the first measured value and the second measured value,
wherein the propulsion system or the evaluation device further comprises a control device,
wherein the control device is adapted:
   to control the advancement of the cable by the propulsion device, and
   to slow down or accelerate the advancement of the cable by the propulsion device if the amount of the difference between the first measured value and the second measured value is greater than zero or exceeds a predetermined threshold value.

2. The propulsion system of claim 1, wherein the control device is adapted to adjust the advancement of the cable in stages by the propulsion device until the amount of the difference between the first measured value and the second measured value is equal to zero or falls below the predetermined threshold value.

3. The propulsion system of claim 1, wherein the measuring device for measuring the advancement of the cable comprises:
- a compensation device, comprising:
  - at least one magnet mounted so as to be rotatable about an axis of rotation, and
  - a magnet holder for receiving the at least one rotatably mounted magnet, and
  - a magnetic field sensor, wherein
- the cable can be guided past the compensation device while the cable is being advanced,
- the at least one rotatably mounted magnet is arranged on the magnet holder in such a way that the advancement of the cable can cause rotations of the at least one rotatably mounted magnet about the axis of rotation, wherein the magnet holder of the compensation device is adapted to follow a movement of the cable in the radial direction during advancement, and
- the magnetic field sensor is arranged at a distance from the at least one rotatably mounted magnet and is adapted to detect the rotations of the at least one rotatably mounted magnet, wherein the detected rotations are a measure of the advancement of the cable.

4. The propulsion system of claim 3, wherein the compensation device of the measuring device for measuring the advancement of the cable comprises an actuator which acts on the magnet holder, wherein the actuator is designed to cause
- a pivoting of the magnet holder about a pivot axis or
- a linear displacement of the magnet holder, as a result of which the magnet holder follows the radial movement of the cable.

5. The propulsion system of claim 3, wherein the magnet holder of the measuring device for measuring the advancement of the cable comprises a pivot arm, and the at least one rotatably mounted magnet is arranged at the free end of the pivot arm.

6. The propulsion system of claim 1, wherein the cable is a push rod.

7. A method for reducing slippage when advancing a cable of a sewer cleaning and/or sewer inspection system, wherein
- a) a first measured value of the advancement of the cable is determined,
- b) a second measured value of the advancement of the cable is determined, wherein the second measured value is determined independently of the first measured value,
- c) a difference is formed between the first measured value and the second measured value, and
- d) the advancement of the cable is slowed down or accelerated if the amount of the difference is greater than zero or exceeds a predetermined threshold value, wherein the slippage is reduced by adjusting the advancement.

8. The method of claim 7, wherein the advancement of the cable is adjusted in stages, until the amount of the difference between the first measured value and the second measured value is equal to zero or falls below the predetermined threshold value.

9. The method of claim 7, wherein, to determine the second measured value,
- a) a rotatably mounted magnet is arranged on the cable, wherein the magnet is rotated by means of the cable being advanced,
- b) a magnetic field sensor is arranged relative to the magnet, wherein the rotations of the magnet are detected by means of the magnetic field sensor, and
- c) the second measured value is derived from the detected rotations.

10. The method of claim 8, wherein the first measured value and/or the second measured value are each formed by a moving average of measured values over a predetermined time period.

11. The method of claim 7, wherein the cable is a push rod.

* * * * *